US010126887B2

(12) United States Patent
Hoshino

(10) Patent No.: US 10,126,887 B2
(45) Date of Patent: Nov. 13, 2018

(54) TOUCH PANEL

(71) Applicant: Panasonic Intellectual Property Management Co., Ltd., Osaka (JP)

(72) Inventor: Hiroyuki Hoshino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 14/785,318

(22) PCT Filed: Mar. 28, 2014

(86) PCT No.: PCT/JP2014/001813
§ 371 (c)(1),
(2) Date: Oct. 16, 2015

(87) PCT Pub. No.: WO2014/174764
PCT Pub. Date: Oct. 30, 2014

(65) Prior Publication Data
US 2016/0070384 A1 Mar. 10, 2016

(30) Foreign Application Priority Data

Apr. 24, 2013 (JP) ................. 2013-091010

(51) Int. Cl.
*G06F 3/044* (2006.01)
*G06F 3/0488* (2013.01)
(Continued)

(52) U.S. Cl.
CPC .............. *G06F 3/044* (2013.01); *G06F 3/045* (2013.01); *G06F 3/0412* (2013.01);
(Continued)

(58) Field of Classification Search
CPC ........ G06F 3/044; G06F 3/045; G06F 3/0412; G06F 3/0416; G06F 3/0482; G06F 3/04883; G06F 3/04886
(Continued)

(56) References Cited

U.S. PATENT DOCUMENTS 7,164,408 B2 * 1/2007 Murade ............... H01L 27/1255
257/E27.111
2007/0002192 A1 * 1/2007 Nishino .............. G02F 1/13338
349/12
(Continued)

FOREIGN PATENT DOCUMENTS

| JP | 2002-157086 | 5/2002 |
|----|-------------|--------|
| JP | 2009-123193 | 6/2009 |
| WO | 2011/111748 | 9/2011 |
| WO | 2012/056737 | 5/2012 |

OTHER PUBLICATIONS

International Search Report of PCT application No. PCT/JP2014/001813 dated May 27, 2014.

*Primary Examiner* — Fred Tzeng
(74) *Attorney, Agent, or Firm* — McDermott Will & Emery LLP

(57) ABSTRACT

A touch panel includes multiple first electrodes, multiple first wiring lines, multiple second electrodes, multiple second wiring lines, a switch electrode, a third wiring line, and a shield section. The first electrodes are disposed parallel to each other in the first direction. The second electrodes intersect with the first electrodes, and are disposed parallel to each other in the second direction. The shield section is insulated from the second wiring lines and the third wiring lines, and is disposed to cover the second wiring lines and the third wiring lines.

13 Claims, 5 Drawing Sheets

(51) Int. Cl.
   *G06F 3/045* (2006.01)
   *G06F 3/0482* (2013.01)
   *G06F 3/041* (2006.01)

(52) U.S. Cl.
   CPC ........ *G06F 3/0482* (2013.01); *G06F 3/04883* (2013.01); *G06F 3/04886* (2013.01); *G06F 2203/04107* (2013.01); *G06F 2203/04803* (2013.01); *G06F 2203/04804* (2013.01)

(58) Field of Classification Search
   USPC ........................................................ 345/174
   See application file for complete search history.

(56) References Cited

U.S. PATENT DOCUMENTS

| | | | |
|---|---|---|---|
| 2007/0024596 A1* | 2/2007 | Takahashi | G06F 3/044 345/173 |
| 2009/0122026 A1 | 5/2009 | Oh | |
| 2009/0256821 A1* | 10/2009 | Mamba | G06F 3/044 345/174 |
| 2010/0020032 A1* | 1/2010 | Mamba | G06F 3/044 345/173 |
| 2010/0295810 A1* | 11/2010 | Nagata | G06F 3/0416 345/173 |
| 2011/0050624 A1* | 3/2011 | Lee | G06F 3/045 345/174 |
| 2012/0170283 A1 | 7/2012 | Kobayashi et al. | |

* cited by examiner

TOUCH PANEL

CROSS-REFERENCE TO RELATED APPLICATIONS

This application is a U.S. national stage application of the PCT International Application No. PCT/JP2014/001813 filed on Mar. 28, 2014, which claims the benefit of foreign priority of Japanese patent application 2013-091010 filed on Apr. 24, 2013, the contents all of which are incorporated herein by reference.

TECHNICAL FIELD

The technical field relates to capacitive touch panels used mainly for operating various input devices.

BACKGROUND ART

In recent years, input devices with various display patterns achieved by mounting a light-transmissive touch panel on a display face of display device, such as liquid crystal display, have been employed typically in mobile phones and car navigation systems.

In these input devices, a menu is displayed on a display device, and the user operates the touch panel to execute predetermined controls.

FIG. 6 is a top view of conventional input device 10. FIG. 7 is a schematic sectional view of conventional input device 10. FIGS. 6 and 7 illustrate input device 10 employing resistive film touch panel 1.

To allow easy-understanding of the structure, dimensions in the thickness direction are magnified in the drawings. In resistive film touch panel 1, transparent surface electrode 18A is formed on substrate 16. Transparent surface electrode 18B is formed on substrate 17. Substrate 16 and substrate 17 are bonded with adhesive 20 such that surface electrode 18A and surface electrode 18B face each other with a predetermined space in between. Surface electrode 18A touches surface electrode 18B when the user presses substrate 16 with a finger, and a change in voltage is detected at a portion pressed.

Input device 10 includes touch panel 1 and display device 2. Touch panel 1 is disposed on the top face of display device 2. An area of touch panel 1 is larger than that of display device 2, and thus touch panel 1 has independent touch panel area 1A that is not overlaid on display device 2.

Display device 2 displays menus 3 and 4. Menu 4 can be operated by pressing control part 5 of touch panel 1. Control part 5 corresponds to the top face of menu 4 and detection area 6 in independent touch panel area 1A.

Since control part 5 includes detection area 6 in independent touch panel area 1A, control part 5 can be made broader than menu 4 even if an area for displaying menu 4 is small. Accordingly, reliable operation can be achieved.

The prior art document regarding this application is known, for example, PTL1.

CITATION LIST

Patent Literature

PTL 1: Unexamined Japanese Patent Publication No. 2002-157086

SUMMARY OF THE INVENTION

A touch panel includes multiple first electrodes, multiple first wiring lines, multiple second electrodes, multiple second wiring lines, a switch electrode, a third wiring line, and a shield section. The first electrodes are disposed parallel to each other in the first direction. The first wiring lines are connected to the respective first electrodes. The second electrodes are insulated from the first electrodes, intersect with the first electrodes, and are disposed parallel to each other in the second direction. The second wiring lines are connected to the respective second electrodes. The switch electrode is insulated from the first electrodes and the second electrodes. The third wiring line is connected to the switch electrode. The shield section is insulated from the second wiring lines and the third wiring line, and disposed to cover the second wiring lines and the third wiring line.

DESCRIPTION OF EMBODIMENTS

Figure 6:
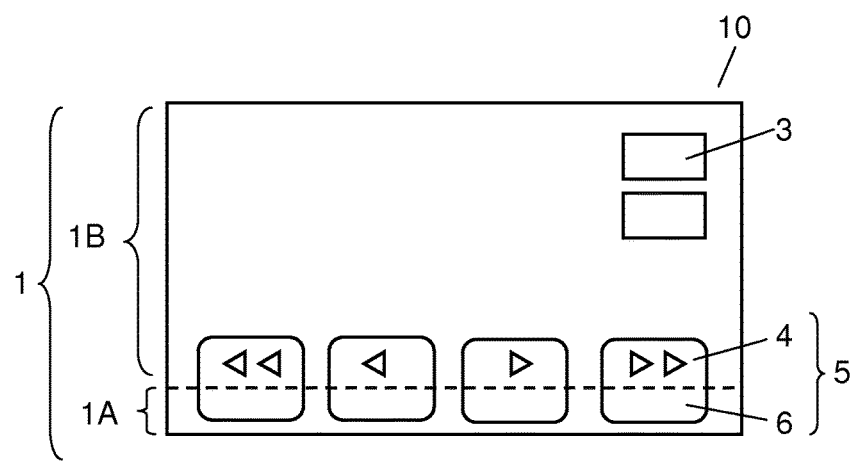
FIG. 6 is a top view of a conventional input device.
Figure 7:
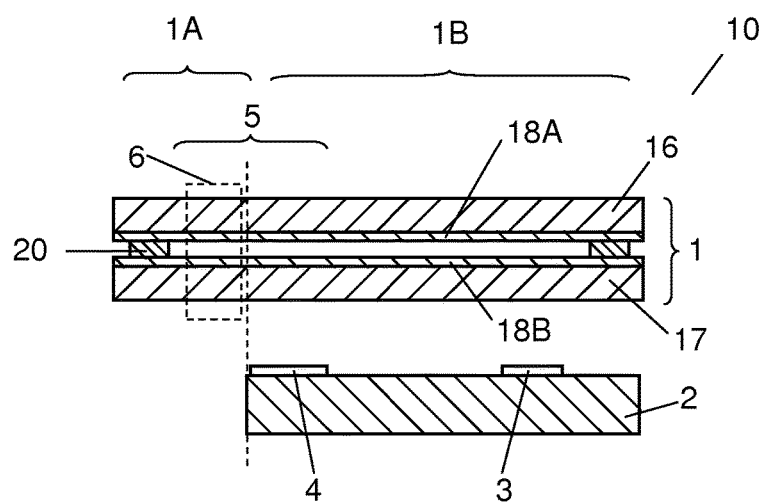
FIG. 7 is a schematic sectional view of the conventional input device.

Before describing an exemplary embodiment, the problem of the prior art is described. When resistive film touch panel 1, as shown in FIGS. 6 and 7, is used, detection accuracy reduces as the screen becomes larger in size. In addition, further higher durability and impact resistance are required. Therefore, a capacitive touch panel that has high durability, impact resistance, and detection accuracy has been increasingly used in recent years.

In the capacitive touch panel, an electrode is formed on a substrate, and then a cover is provided on it. Electrostatic capacitance changes as the user puts his/her finger closer to the cover surface, and thus a finger position is detected.

When the capacitive touch panel is used, it is better to display menu 4 using individual switch electrodes (not illustrated) than to provide menu 4 in display part 1B, as in FIG. 6. This is more preferable because display part 1B can be fully used and reliable menu operation can also be achieved. However, if menu 4 is displayed using individual switch electrodes, electromagnetic waves entering from outside may generate noise and cause faulty operation.

The exemplary embodiment that solves the above problem of the prior art is described below with reference to drawings.

To make the structure easy to understand, dimensions are partially magnified in the drawings.

Figure 1:
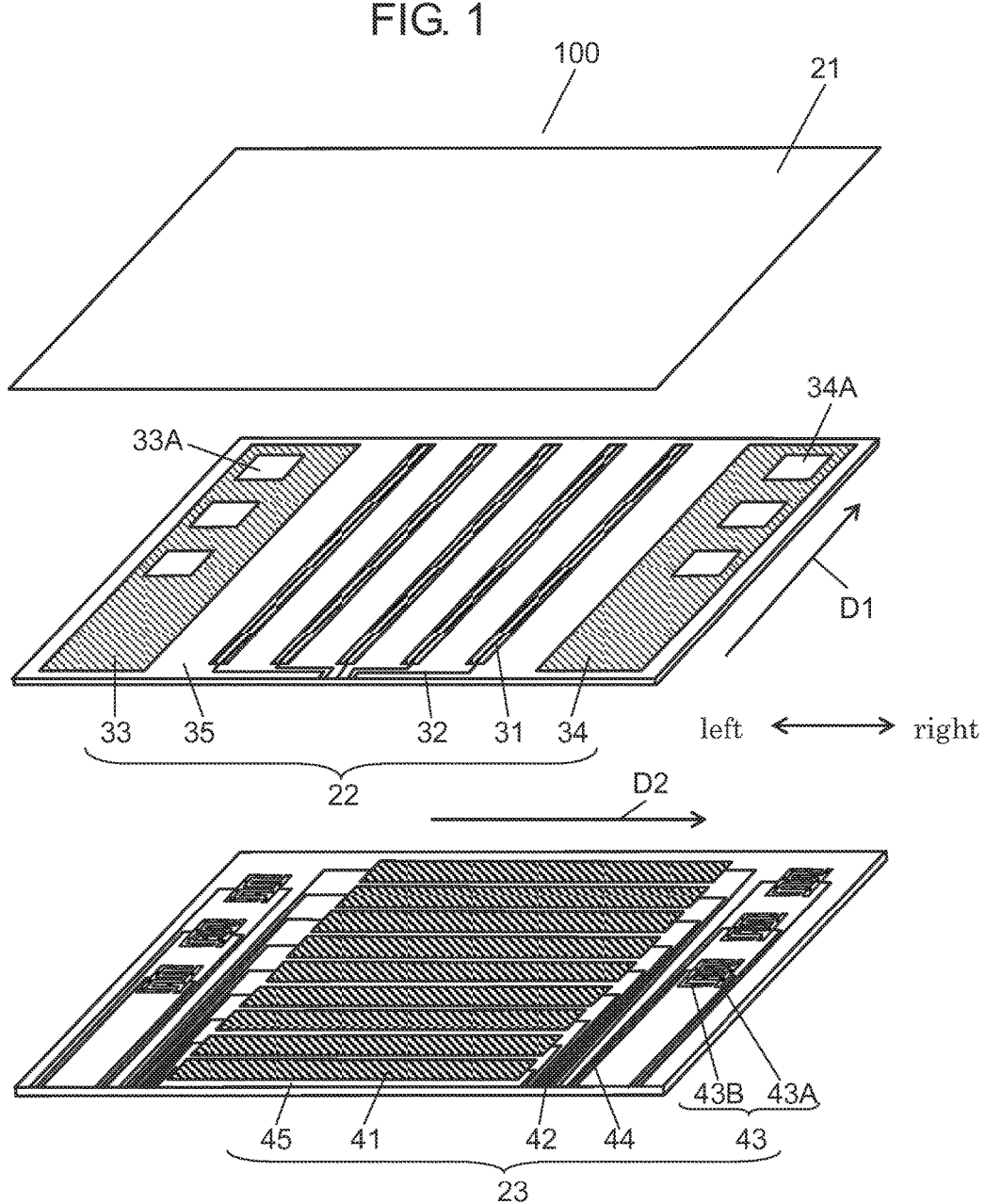
FIG. 1 is an exploded perspective view of a touch panel in accordance with an exemplary embodiment.
Figure 2:
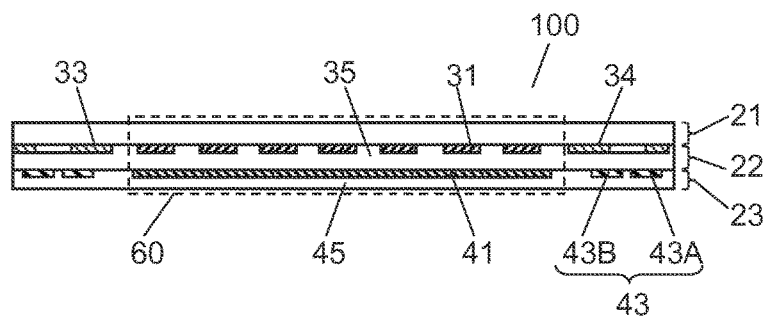
FIG. 2 is a sectional view of the touch panel in accordance with the exemplary embodiment.

FIG. 1 is an exploded perspective view of a touch panel in the exemplary embodiment. FIG. 2 is a sectional view of the touch panel in the exemplary embodiment.

Touch panel 100 includes multiple first electrodes 31, multiple first wiring lines 32, multiple second electrodes 41, multiple second wiring lines 42, switch electrode 43, third wiring line 44, and shield sections 33 and 34. First electrodes 31 are disposed parallel to each other in first direction D1. First wiring lines 32 are connected to respective first electrodes 31. Second electrodes 41 are insulated from first electrodes 31, intersect with first electrodes 31, and are disposed parallel to each other in second direction D2. Second wiring lines 42 are connected to respective second electrodes 41. Switch electrode 43 is insulated from first electrodes 31 and second electrodes 41. Third wiring line 44 is connected to switch electrode 43. Shield sections 33 and 34 are insulated from second wiring lines 42 and third wiring line 44, and disposed to cover second wiring lines 42 and third wiring line 44.

Touch panel 100 in the exemplary embodiment is detailed below. Touch panel 100 includes cover layer 21, first substrate layer 22, and second substrate layer 23.

Substantially-rectangular cover layer 21 is, for example, formed by providing a hard coat layer on the top face of a resin film. Alternatively, cover layer 21 may be formed of glass.

First substrate layer 22 includes first substrate 35, and multiple first electrodes 31, multiple first wiring lines 32, and shield sections 33 and 34 formed on first substrate 35. In other words, first electrodes 31, first wiring lines 32, and shield sections 33 and 34 are formed on the same plane, and they are supported by first substrate 35. First electrodes 31 are formed in first direction D1. Each end of first wiring lines 32 is connected to each of first electrodes 31. Shield sections 33 and 34 are disposed to the left and right of first substrate 35 with first electrodes 31 in between. Here, first direction D1 is the short-side direction of first substrate layer 22. The left and right direction is a direction perpendicular to the extending direction of first electrodes 31.

First substrate 35 is substantially rectangular, and is formed, for example, of a light-transmissive insulating resin film. Alternatively, first substrate 35 may be formed of glass.

First electrodes 31 are aligned at a predetermined interval. In addition, first electrodes 31 have belt shapes with substantially the same width. First electrodes 31 are preferably formed of indium tin oxide or tin oxide, or the like.

First wiring lines 32 are extended from one ends of first electrodes 31, respectively. However, each of first wiring lines 32 may also be extended from both ends of each of first electrodes 31. First wiring lines 32 are preferably formed of metal, such as silver and copper.

Shield section 33 is disposed to the left of first electrodes 31. Shield section 34 is disposed to the right of first electrodes 31. Multiple holes 33A are created in shield section 33. Multiple holes 34A are created in shield section 34. Switch electrode 43 is exposed from each of holes 33A and 34A so that switch electrode 43 can be operated. Shield sections 33 and 34 are preferably formed of metal, such as silver and copper.

Second substrate layer 23 includes second substrate 45, and multiple second electrodes 41, multiple second wiring lines 42, multiple switch electrodes 43, and multiple third wiring lines 44 formed on second substrate 45. In other words, second electrodes 41, second wiring lines 42, switch electrodes 43, and third wiring lines 44 are formed on the same plane, and they are supported by second substrate 45. Second electrodes 41 are formed parallel to each other in second direction D2. Ends of second wiring lines 43 are connected to second electrodes 41, respectively. Third wiring lines 44 are connected to switch electrodes 43. Here, second direction D2 is the long-side direction of second substrate layer 23.

In the exemplary embodiment, first direction D1 is the short-side direction of first substrate layer 22, and second direction D2 is the long-side direction of second substrate layer 23. However, first direction D1 and second direction D2 are not limited to the above directions, as long as first direction D1 and second direction D2 are not parallel and have a predetermined angle to each other. Preferably, however, first direction D1 is perpendicular to second direction D2.

Here, second substrate 45 is substantially rectangular, and is formed, for example, of a light-transmissive insulating resin film. Alternatively, second substrate 45 may be formed of glass.

Second electrodes 41 are aligned at a predetermined interval. In addition, second electrodes 41 have belt shapes with substantially the same width. Second electrodes 41 are preferably formed of indium tin oxide or tin oxide, or the like.

Each of second wiring lines 42 is extended from both ends of each of second electrodes 41. However, second wiring lines 42 may be extended from one ends of second electrodes 41. Second wiring lines 42 are preferably formed of silver or copper, or the like.

Switch electrodes 43 are configured by combining comb-like electrodes 43A and 43B. Electrodes 43A and 43B are formed of a light-transmissive conductive material, such as indium tin oxide and tin oxide, or metal, such as silver and copper.

As a material for switch electrode 43, a light-transmissive conductive material is preferably used. By using the light-transmissive conductive material, switch electrode 43 can be lighted from beneath or an icon can be disposed beneath. This enables to change the display of switch electrode 43.

Third wiring lines 44 are extended from electrodes 43A and 43B. Third wiring lines 44 are preferably formed of metal, such as silver and copper.

As described above, conductive metal is preferably used as materials for first wiring lines 3, second wiring lines 42, and third wiring lines 44. Conductive metal has resistance smaller than that of light-transmissive conductive material, and thus loss at transmitting signals reduces.

First substrate layer 22 is fixed on the top face of second substrate layer 23, typically by acrylic adhesive (not illustrated). Then, cover layer 21 is fixed on the top face of first substrate layer 22, typically by acrylic adhesive (not illustrated).

In the above structure, shield section 33 or shield section 34 covers an upside of second wiring lines 42 and third wiring lines 44. Therefore, shield section 33 and shield section 34 can attenuate electromagnetic waves reaching touch panel 100 from outside. Noise on second wiring lines 42 and third wiring lines 44 is thus suppressed. Comparing the average lengths, second wiring lines 42 are longer than first wiring lines 32. In addition, third wiring lines 44 are longer than first wiring lines 32. Therefore, noise enters more easily to second wiring lines 42 than to first wiring lines 32. Noise also enters more easily to third wiring lines 44 than to first wiring lines 32. Accordingly, noise can be effectively suppressed by forming shield section 33 or shield section 34 over second wiring lines 42 and third wiring lines 44.

Figure 3:
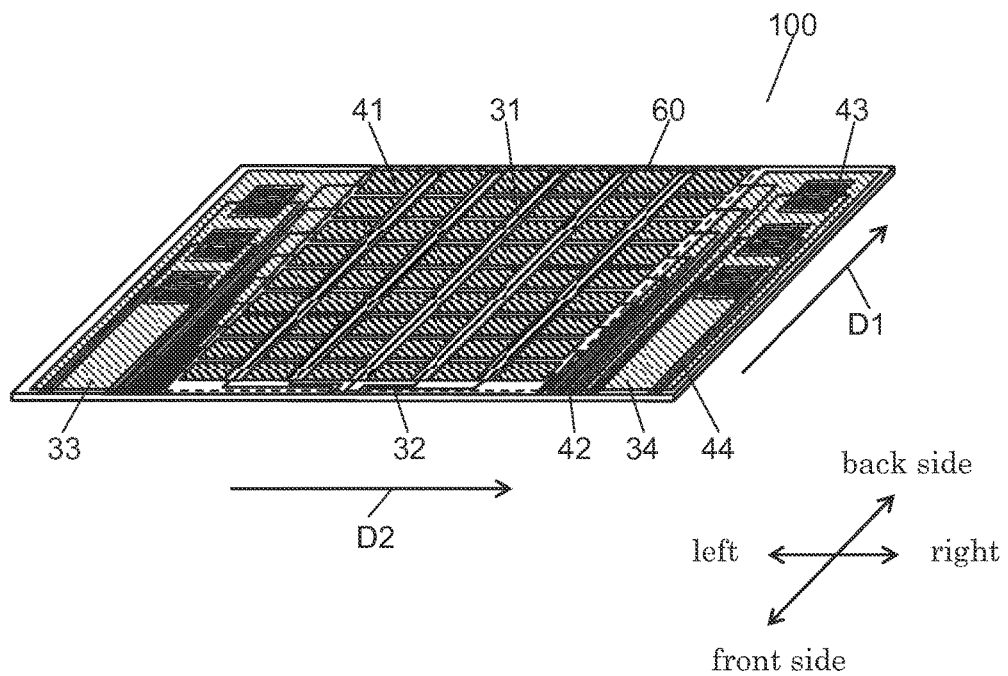
FIG. 3 is a perspective view of the touch panel in accordance with the exemplary embodiment.

FIG. 3 is a perspective view of touch panel 100 in the exemplary embodiment.

Operation area 60 is an area where first electrodes 31 and second electrodes 41 are disposed. Here, second electrodes 41 are sending electrodes, and first electrodes 31 are receiving electrodes. For example, second electrodes 41 achieve transmission by switching one by one from the back to front. While second electrodes 41 are transmitting, first electrodes 31 receiving it are switched one by one, for example, from the left end to the right end. Then, a change in electrostatic capacitance in one of first electrodes 31 is detected based on electrostatic capacitance detected at first electrodes 31. This allows to determine a detected object position, such as a finger, in second direction D2. Also at this point, a detected object position, such as a finger, in first direction D1 is determined by determining which of second electrodes 41 is making transmission. As a result, the detected object position is identified. Here, the back side refers to a part away from first wiring lines 32, and the front side refers to a part close to first wiring lines 32.

First wiring lines 32, shield sections 33 and 34, second wiring lines 42, switch electrodes 43, and third wiring lines 44 are disposed on both sides (outside) of operation area 60. In other words, third wiring lines 44 are disposed in first direction D1 on both sides (outside) of second electrodes 41. Switch electrodes 43 are disposed on both sides (outside) of second electrodes 41. Shield sections 33 and 34 are disposed in first direction D1 on both sides (outside) of first electrodes 31.

Electrodes 43A and 43B configuring switch electrode 43 operate as electrodes for sending or receiving the electric field. Approach or contact of an object, such as a finger, is determined based on a change in electrostatic capacitance detected via electrodes 43A and 43B. In other words, operation area 60 is employed as a projected capacitive form, and switch electrode 43 is employed as a surface capacitive form.

Figure 4:
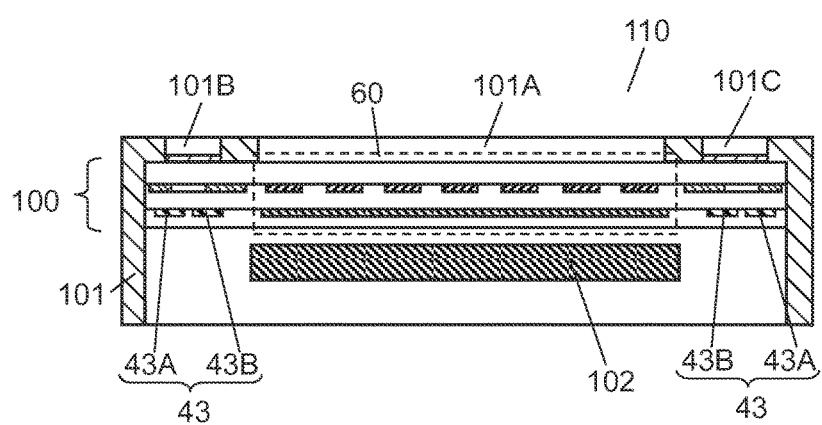
FIG. 4 is a sectional view of an input device employing the touch panel in accordance with the exemplary embodiment.

FIG. 4 is a sectional view of input device 110 employing touch panel 100 in the exemplary embodiment. Input device 110 includes touch panel 100, casing 101, and display device 102.

Casing 101 has square hole 101A at a position corresponding to operation area 60. Casing 101 also has square hole 101B at a position corresponding to switch electrodes 43 to the left, and square hole 101C at a position corresponding to switch electrodes 43 to the right.

Display device 102 includes a display element, such as liquid crystal display or organic electroluminescence display, and is disposed on the bottom face of touch panel 100. The user can operate touch panel 100 typically with a finger while looking at an image on display device 102 through touch panel 100.

First electrodes 31 are connected to an electronic circuit (not illustrated) of input device 110 via first wiring lines 32, second electrodes 41 via second wiring lines 42, and switch electrodes 43 via third wiring lines 44. Display device 102 is connected to the electronic circuit (not illustrated) of input device 110 typically via a connector and lead wire (not illustrated).

When the user moves an object, such as a finger, close to touch panel 100, electrostatic capacitance between first electrode 31 and second electrode 41 changes. Alternatively, electrostatic capacitance of switch electrode 43 changes. Then, the electronic circuit detects this change. In this way, approach or contact of object, such as a finger, is determined on touch panel 100. Then, diversifying functions of input device 110 are switched depending on the approach or contact position of the object.

For example, if input device 110 is used as a car navigation system, a map is displayed on a position corresponding to operation area 60 of display device 102. In addition, menus are displayed on a position corresponding to switch electrodes 43 of display device 102. For example, the menus are a selection menu for displaying a wide/detailed map, a switching menu for displaying audio, and a selection menu for displaying audio volume.

In the state a map is displayed, a map at a contact position changes to a wide display or detail display when the user touches and pinches operation area 60 with two fingers. By flicking, the map quickly scrolls in a predetermined direction. The pinching operation refers to the operation of making two fingers touching the top face of touch panel 100 come close or separate. The flicking operation refers to the operation of quickly sliding the finger touching the top face of touch panel 100.

If the user touches the top face of touch panel 100 corresponding to switch electrode 43 when 'audio' is displayed on the menu, a display on display device 102 switches to audio.

Figure 5A:
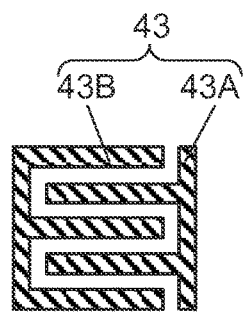
FIG. 5A is a top view of a switch electrode of the touch panel in accordance with the exemplary embodiment.
Figure 5B:
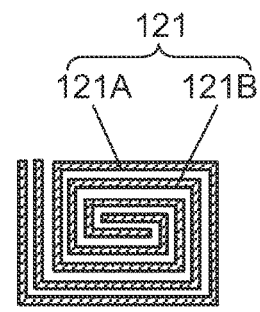
FIG. 5B is a top view of another switch electrode of the touch panel in accordance with the exemplary embodiment.
Figure 5C:
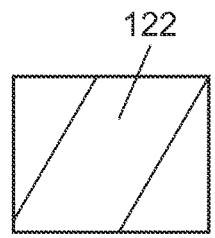
FIG. 5C is a top view of another switch electrode of the touch panel in accordance with the exemplary embodiment.
Figure 5D:
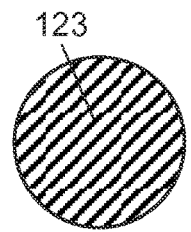
FIG. 5D is a top view of another switch electrode of the touch panel in accordance with the exemplary embodiment.

FIG. 5A is a top view of switch electrode 43 of touch panel 100 in the exemplary embodiment. The exemplary embodiment uses comb-like electrodes 43A and 43B as switch electrode. However, a switch electrode with any shape is applicable as long as a change in electrostatic capacitance is detectable. FIGS. 5B to 5D are top views of other switch electrodes of touch panel 100 in the exemplary embodiment. As shown in switch electrode 121 in FIG. 5B, electrodes 121A and 121B may be spiral. In addition, as shown in switching electrode 122 in FIG. 5C and switch electrode 123 in FIG. 5D, the switch electrode may be configured with a single electrode.

In the exemplary embodiment, shield sections 33 and 34 are formed on first substrate 35 where first electrodes 31 and first wiring lines 32 are formed. However, shield sections 33 and 34 may be formed on a substrate other than first substrate 35. Moreover, shield sections 33 and 34 may be formed on cover layer 21. However, shield sections 33 and 34 can be formed together with first wiring lines 32 if they are formed on first substrate 35 in the case shield sections 33 and 34 are formed of conductive metal. In the case shield sections 33 and 34 are formed of a light-transmissive conductive material, they can be formed together with first electrodes 31, typically by printing. This facilitates fabrication. Accordingly, shield sections 33 and 34 are preferably formed simultaneously with first electrodes 31 or first wiring lines 32. In other words, shield sections 33 and 34 are preferably formed on first substrate 35.

Furthermore, switch electrode 43 and third wiring lines 44 are formed on second substrate 45 where second electrodes 41 are formed in the exemplary embodiment. However, switch electrodes 43 and third wiring lines 44 may be formed on a substrate other than second substrate 45. However, if switch electrodes 43 are formed of a light-transmissive conductive material, such as indium tin oxide and tin oxide, they can be formed together with second electrodes 41. If switch electrodes 43 are formed of conductive metal, such as silver and copper, they can be formed together with second wiring lines 42 or third wiring lines 44. Accordingly, switch electrodes 43 and third wiring lines 44 are preferably formed on second substrate 45.

In the exemplary embodiment, second electrodes 41 are sending electrodes and first electrodes 31 are receiving electrodes. However, second electrodes 41 may be receiving electrodes and first electrodes 31 may be sending electrodes.

First electrodes 31 and second electrodes 41 may also be formed in a strip of multiple diamond-shaped electrodes. In other words, these electrodes may be configured with a string of diamond-like electrodes.

As described above, touch panel 100 in the exemplary embodiment includes multiple first electrodes 31 disposed parallel to each other, first wiring lines connected to first electrodes 31, and shield sections 33 and 34 insulated from first electrodes 31. Touch panel 100 further includes multiple second electrodes 41 insulated from first electrodes 31 and disposed parallel to each other, second wiring lines 42 connected to second electrodes 41, switch electrodes 43 insulated from first electrodes 31 and second electrodes 41, and third wiring lines 44 connected to switch electrodes 43. An approach or contact position of an object is detected by a change in electrostatic capacitance between first electrode 31 and second electrode 41. An approach or contact position of the object is also detected by a change in electrostatic capacitance of switch electrode 43. Shield sections 33 and 34 are disposed to cover second wiring lines 42 and third wiring lines 44 in the top view. Shield sections 33 and 34 suppress entry of electromagnetic waves from outside to second wiring lines 42 and third wiring lines 44. This prevents faulty operations.

Touch panel 100 further includes first substrate 35 on which shield sections 33 and 34 are disposed. First electrodes 31 and first wiring lines 32 are disposed on the same plane as shield sections 33 and 34 on first substrate 35. This enables to form shield sections 33 and 34 simultaneously with first wiring lines 32 if shield sections 33 and 34 are formed of conductive metal. When shield sections 33 and 34 are formed of a light-transmissive conductive material, they can be formed simultaneously with first electrodes 31, typically by printing. As a result, fabrication is facilitated.

An average length of second wiring lines 42 is longer than an average length of first wiring lines 32. In addition, an average length of third wiring lines 44 is longer than the average length of first wiring lines 32. Accordingly, noise can be sufficiently suppressed even if shield sections 33 and 34 cover second wiring lines 42 and third wiring lines 44 but not cover first wiring lines 32.

Furthermore, first electrodes 31 and second electrodes 41 configure operation area 60 when seen from the top. Multiple switch electrodes 43 are disposed such that they sandwich operation area 60. As a result, switch electrodes 43 are disposed at a position easy for the user to operate.

As described above, shield sections 33 and 34 prevent entry of electromagnetic waves from outside to second wiring lines 42 and third wiring lines 44 in touch panel 100 in the exemplary embodiment.

INDUSTRIAL APPLICABILITY

The touch panel in the exemplary embodiment has a structure of disposing switch electrodes on the touch panel, and has a beneficial effect of suppressing electromagnetic waves entering from outside. Accordingly, this touch panel is effectively applicable mainly to various input devices.

The invention claimed is:
1. A touch panel comprising:
a plurality of first electrodes disposed parallel to each other in a first direction;
a plurality of first wiring lines connected to the plurality of first electrodes, respectively;
a plurality of second electrodes disposed parallel to each other in a second direction, insulated from the plurality of first electrodes, and intersecting with the plurality of first electrodes;
a plurality of second wiring lines connected to the plurality of second electrodes, respectively;
a switch electrode insulated from the plurality of first electrodes and the plurality of second electrodes, the switch electrode being disposed in a separate area from an operation area in which the plurality of first electrodes and the plurality of second electrodes are disposed;
a third wiring line connected to the switch electrode; and
an electric shield insulated from the second wiring lines and the third wiring line, and disposed to cover the second wiring lines and the third wiring line,
wherein the switch electrode and the third wiring line are disposed on a surface of a substrate on which the plurality of first electrodes and the plurality of first wiring lines are disposed or a surface of a substrate on which the plurality of second electrodes and the plurality of second wiring lines are disposed,
the plurality of second electrodes, the plurality of second wiring lines, the switch electrode, and the third wiring line are formed on a same surface,
the third wiring line is one of a plurality of third wiring lines, and
the plurality of third wiring lines are disposed in the first direction on both sides of the plurality of second electrodes.
2. The touch panel of claim 1,
wherein the plurality of first electrodes, the plurality of first wiring lines, and the electric shield are formed on a same surface.
3. The touch panel of claim 2, further comprising a first substrate to support the plurality of first electrodes, the plurality of first wiring lines, and the electric shield on the same surface of the first substrate.
4. The touch panel of claim 2,
wherein the electric shield is one of a plurality of electric shields, and
the plurality of electric shields are formed in the first direction on both sides of the plurality of first electrodes.
5. The touch panel of claim 1, further comprising a second substrate to support the plurality of second electrodes, the plurality of second wiring lines, the switch electrode, and the third wiring line on the same surface of the second substrate.
6. The touch panel of claim 1,
wherein the switch electrode is one of a plurality of switch electrodes, and
the plurality of switch electrodes are disposed on both sides of the plurality of second electrodes.
7. The touch panel of claim 1, wherein
the switch electrode is one of a plurality of switch electrodes that are formed in the first direction on at least one side of both sides of the operation area.
8. The touch panel of claim 1,
wherein the first direction and the second direction are perpendicular to each other.
9. The touch panel of claim 1,
wherein the electric shield is formed of metal.
10. The touch panel of claim 1,
wherein the switch electrode is disposed on at least one side of both sides of the plurality of second electrodes, and the third wiring line and the electric shield are disposed on the one side of the both sides in the first direction.

11. A touch panel comprising:
a plurality of first electrodes disposed parallel to each other in a first direction;
a plurality of first wiring lines connected to the plurality of first electrodes, respectively;
a plurality of second electrodes disposed parallel to each other in a second direction, insulated from the plurality of first electrodes, and intersecting with the plurality of first electrodes;
a plurality of second wiring lines connected to the plurality of second electrodes, respectively;
a switch electrode insulated from the plurality of first electrodes and the plurality of second electrodes, the switch electrode being disposed in a separate area from an operation area in which the plurality of first electrodes and the plurality of second electrodes are disposed;
a third wiring line connected to the switch electrode; and
an electric shield insulated from the second wiring lines and the third wiring line, and disposed to cover the second wiring lines and the third wiring line, wherein:
the switch electrode and the third wiring line are disposed on a surface of a substrate on which the plurality of first electrodes and the plurality of first wiring lines are disposed or a surface of a substrate on which the plurality of second electrodes and the plurality of second wiring lines are disposed,
the third wiring line is one of a plurality of third wiring lines, and
an average length of the second wiring lines and an average length of the plurality of third wiring lines are both longer than an average length of the first wiring lines.

12. A touch panel comprising:
a plurality of first electrodes disposed parallel to each other in a first direction;
a plurality of first wiring lines connected to the plurality of first electrodes, respectively;
a plurality of second electrodes disposed parallel to each other in a second direction crossing the first direction, insulated from the plurality of first electrodes, and intersecting with the plurality of first electrodes;
a plurality of second wiring lines connected to the plurality of second electrodes, respectively;
a switch electrode insulated from the plurality of first electrodes and the plurality of second electrodes; and
a third wiring line connected to the switch electrode,
wherein the switch electrode overlaps none of the plurality of first electrodes, the plurality of first wiring lines, the plurality of second electrodes and the plurality of second wiring lines viewed from a third direction perpendicular to the first and second direction.

13. The touch panel of claim 12, further comprising an electric shield insulated from the second wiring lines and the third wiring line, and disposed to cover the second wiring lines and the third wiring line.

* * * * *